ent US Patent [19] [11] 3,867,312
Stephens  [45] Feb. 18, 1975

[54] EXHAUST GAS CATALYST SUPPORT
[75] Inventor: Ruth E. Stephens, Royal Oak, Mich.
[73] Assignee: Ethyl Corporation, Richmond, Va.
[22] Filed: Feb. 7, 1972
[21] Appl. No.: 224,240

[52] U.S. Cl............... 252/462, 252/463, 423/213.2, 423/213.5
[51] Int. Cl. ......................... B01f 11/06, B01f 11/22
[58] Field of Search ........ 252/462, 466 A; 423/213, 423/214

[56] References Cited
UNITED STATES PATENTS

| | | | |
|---|---|---|---|
| 3,224,981 | 12/1965 | Stephens et al.................. | 252/474 X |
| 3,284,370 | 11/1966 | Clifford et al. ..................... | 252/462 |
| 3,291,564 | 12/1966 | Kearby.............................. | 423/213 |
| 3,322,491 | 5/1967 | Barrett et al..................... | 252/462 X |
| 3,410,651 | 11/1968 | Brandenburg et al. ............. | 423/213 |
| 3,433,581 | 3/1969 | Stephens et al..................... | 423/213 |
| 3,438,721 | 4/1969 | Innes................................. | 423/213 |
| 3,483,138 | 12/1969 | Stephens............................ | 252/462 |
| 3,493,325 | 2/1970 | Roth................................... | 252/471 |
| 3,524,721 | 8/1970 | Stephens......................... | 252/459 X |
| 3,545,917 | 12/1970 | Stephens......................... | 252/462 X |
| 3,679,773 | 7/1972 | Kovach et al................... | 252/462 X |
| 3,741,725 | 6/1973 | Graham .......................... | 423/213.5 |

Primary Examiner—Winston A. Douglas
Assistant Examiner—W. J. Shine
Attorney, Agent, or Firm—Donald L. Johnson; Robert A. Linn; Joseph D. Odenweller

[57] ABSTRACT

A thermally stable and attrition resistant catalyst support, prepared from alumina having a lanthanide series metal oxide uniformly distributed throughout, a catalyst composition utilizing this support, processes for preparing both support and catalyst, and a method of treating internal combustion engine exhaust gases and preventing crystallization of alumina is disclosed.

7 Claims, No Drawings

EXHAUST GAS CATALYST SUPPORT

BACKGROUND OF THE INVENTION

This invention relates to an improved method for preparing stabilized alumina catalyst supports. More particularly, it relates to the use of novel and inexpensive materials to prepare a stabilized activated alumina catalyst support which when used with suitable metal-containing catalysts has been found to be especially effective in the oxidation of automotive exhaust gases. Even more specifically, this invention relates to the use of alumina to which is added a lanthanide series metal compound thereby forming an activated, stabilized catalyst support when calcined at elevated temperatures.

It has been well known that alumina is an excellent support for catalysts in a wide range of chemical reactions. In fact, in many cases alumina has been shown to have catalytic activity of its own and will therefore often enhance the activity of the catalyst it is supporting. It is further known that the activity of an alumina supported catalyst will be dependent on the surface area. It is advantageous to retain a maximum surface area when the alumina is calcined. At very high temperatures phase changes occur which convert the desirable eta or gamma phases into the less desirable theta or alpha phases, resulting in a great drop in the surface area.

According to U.S. Pat. No. 3,291,564, it is known to use potassium, cesium, or barium compounds to stabilize the alumina support and prevent loss of surface area and phase changes at high temperature.

According to British Pat. No. 1,231,276, potassium, calcium, and particularly barium, stabilize alumina, but only when the active catalyst is impregnated in an intermediate zone between the surface and the carrier core.

The extremely severe conditions which prevail in the catalytic oxidation of carbon monoxide and hydrocarbons contained in the exhaust gases from internal combustion engines set unusually severe criteria for such catalysts, and this makes the selection of an effective catalyst extremely difficult. It is generally agreed that an effective catalyst should exhibit the following properties:

a. Catalyst should be effective at a relatively low temperature so that it will function soon after the engine has started, i.e., it must have a short warm-up period or a low activation temperature.
b. It should be highly efficient in oxidizing exhaust hydrocarbons and carbon monoxide.
c. It should have a long life, i.e.,
   1. It should not be easily poisoned.
   2. It should withstand at least 800°C likely to develop during operation.
   3. It should not be abraded by the frequent shaking and occasional shocks characteristic of a pulsating exhaust gas stream.

Extensive research in this field has revealed that many catalysts will effectively oxidize the carbon monoxide and hydrocarbons contained in the exhaust gas from internal combustion engines. However, these catalysts have uniformly failed to be economically feasible in automotive catalytic converters due to their short life.

A primary reason for short catalyst life is the transformation of the alumina support from an amorphous or lower crystalline state (e.g., gamma, eta) to a highly crystalline state by either thermal or chemical means. In the more crystalline state, the catalyst is subject to fracture along the crystal's grain boundary, resulting in powdering, dusting, and eventually loss of catalyst. The formation of more crystalline material can be caused by phase transformation of the amorphous or transitional alumina to crystalline α-alumina through action of heat over a period of time. Further, the interaction of alumina with catalyst metals forming aluminates also forms crystalline structures. In fact, many of the more active metal oxidation catalysts, particularly copper, even promote the formation of aluminates and the crystallization of alumina itself. After formation of such crystalline structures thermal and mechanical shock cause loss of activity through lower surface area, higher activation temperature, attrition, loss of catalyst, and hence shortened life.

Thus, it is an object of this invention to provide a catalyst support which is thermally stable and attrition resistant. A further object is to provide a thermally stable and attrition resistant catalyst composition suitable for use in the exhaust gas of an internal combustion engine. A still further object of this invention is to provide a process for producing a thermally stable and attrition resistant catalyst support and catalyst. Another object of this invention is to provide a method of oxidizing carbon monoxide and hydrocarbons contained in internal combustion engine exhaust gases using the thermally stable and attrition resistant support and catalyst composition provided. Another object is to provide a method for preventing crystallization of alumina at high temperature.

SUMMARY OF THE INVENTION

The above and other objects are accomplished by providing a catalyst suppport composition consisting essentially of an alumina containing from about 1 to about 45 weight per cent based on said alumina of a lanthanide series metal oxide uniformly distributed throughout said alumina. Preferred lanthanide series metal oxides are lanthanum oxide, neodymium oxide, and praseodymium oxide and mixtures thereof.

In a further aspect of this invention there is provided a method of retarding change in the crystalline phase in alumina on heating to elevated temperatures, for example, about 600°C, said method comprising incorporating uniformly throughout said alumina a lanthanide series metal oxide in an amount of from about 1 to about 45 weight per cent based on said alumina.

In a still further aspect, this invention provides a catalyst suitable for use in the exhaust gas of an internal combustion engine, said catalyst consisting essentially of from about 0.005 to about 15 weight per cent of at least one metalcontaining oxidation catalyst supported on a thermally stable and attrition resistant alumina support, said support containing from about 1 to about 45 weight per cent of a lanthanide series metal oxide uniformly distributed throughout said support. Preferred metal-containing oxidation catalysts are copper oxide, platinum, palladium, vanadium oxide, chromium oxide, manganese oxide, iron oxide, nickel oxide, cobalt oxide, and various combinations of these with each other and additional materials.

A still further aspect of the invention is a process for preparing a thermally stable and attrition resistant catalyst support, said process comprising a. forming an aqueous solution of a water-soluble, decomposable salt of a lanthanide series metal and a water-soluble aluminum salt;
b. evaporating the free water from said solution;
c. heating the resultant mixture of aluminum salt and lanthanide series metal salt whereby a uniform mixture of the salts is first formed and subsequently decomposed to their oxides; and
d. cooling said mixture whereby a solid thermally stable and attrition resistant support material is produced.

Also, an active supported copper-containing catalyst can be prepared by a process comprising
a. forming an aqueous salt solution of water-soluble, decomposable aluminum, lanthanum, and copper salts;
b. evaporating the free water from said solution whereby a solid uniform mixture of said salts is produced;
c. heating said mixture at a temperature of from about 400° to about 750°C to decompose said salts to their oxides; and
d. cooling the oxide mixture whereby a copper oxide catalyst composition on an alumina support having the lanthanum oxide uniformly dispersed throughout said catalyst is produced.

The catalyst of this invention is useful as an automotive exhaust gas catalyst. Hence, the invention provides a method of oxidizing carbon monoxide and hydrocarbons contained in internal combustion engine exhaust gases by contacting them at elevated temperatures with the catalysts of this invention.

DESCRIPTION OF THE PREFERRED EMBODIMENTS

A preferred embodiment of this invention is a thermally stable and attrition resistant catalyst support composition consisting essentially of an alumina, selected from amorphous and transitional alumina, containing from about 1 to about 45 weight per cent based on said alumina of a lanthanide series metal oxide uniformly distributed throughout said alumina.

The alumina which forms the major portion of the support material can be either amorphous or transitional alumina which is well known and commercially produced in various forms. Alumina is made in amorphous, transitional, and refractory forms, the last being unsuitable for compositions of this invention. The transitional aluminas are meta stable forms which are produced by heating alpha- or beta-alumina trihydrates or alpha-alumina monohydrate forming the various transitional aluminas such as gamma, delta, eta, theta, kappa, chi, and rho depending both on the temperature and time of heating. Usually a mixture of these transitional aluminas is formed. On prolonged heating, particularly at very high temperatures such as 1,150°C, the transitional aluminas are converted to "alpha-alumina" which is a stable refractory type alumina not applicable to this invention. In addition to the refractory and transitional forms described above, there is a truly amorphous alumina which is characterized by having no definite X-ray diffraction pattern. This amorphous material is usually present along with the transitional aluminas. The highly crystalline alpha-aluminum formed on heating to high temperatures is not suitable because it has lower surface area and degrades into a powder of microscopic crystallites. It has been found that crystalline phase changes in amorphous alumina (e.g., to alpha-alumina) and of the transitional aluminas to more highly crystalline phases can be retarded by stabilization according to this invention. In other words the present invention tends to stabilize an alumina support in its original phase whether it be amorphous or transitional. It is believed that crystalline phase changes which occur during prolonged exposure to elevated temperatures such as occur in treating exhaust gas are what causes most catalyst support material to crumble and be lost from the catalyst bed or to compact causing excessive back pressure.

The amorphous or transitional alumina used as a starting material is prepared by any convenient method known in the prior art, such as by decomposing a salt of aluminum; for example, the nitrate, sulfate, oxalate, acetate, and the like. Commercially, large scale preparation of alumina is carried out as a by-product of the Fickes-Sherwin modification of the Bayer process for the manufacture of metallic aluminum. This process includes precipitating aluminum hydroxide from an alkali aluminate solution, crushing, grinding, and calcining the alumina between 300° and 800°C. The finished material is used primarily as a commercial absorbent. It is advantageously used in high pressure applications without packing and is readily regenerated. In addition, the support of this invention can be produced by a novel process involving coprecipitation of the alumina and stabilizing lanthanide series metal oxide as will be discussed more fully hereinafter.

The advantageous thermal stabilization and attrition resistant properties are imparted to the above aluminas when a lanthanide series metal compound is uniformly distributed throughout said alumina. The lanthanide series metal is present in the alumina support as an oxide. Metals in the lanthanide series are lanthanum, cerium, praseodymium, neodymium, promethium, samarium, gadolinium, terbium, dysprosium, holmium, erbium, thulium, ytterbium, and lutetium. Mixtures of all or part of these, available commercially as their salts, may also be conveniently employed. The most common and most practical, hence the preferred, lanthanide series metals are lanthanum, praseodymium, and neodymium. The lanthanide series metals will be present in the finally prepared support alone or the catalyst composition in the form of an oxide. Accordingly, the preferred stabilizing agent is preferably lanthanum oxide, praseodymium oxide, or neodymium oxide. However, the usual starting material is a salt of a lanthanide series metal, usually a water-soluble, decomposable salt, of which the nitrate, sulfate, and acetate are preferred.

The lanthanide series metal oxide can be present in an amount of from about 1 to about 45 per cent by weight based on the weight of the alumina. Preferably, from about 15 to about 35 per cent by weight is used to stabilize the amorphous alumina. Although the various metal oxides of the lanthanide series may be used to a greater or lesser extent, the amount should not be more than about a 1:4 atom ratio of lanthanide series metal to aluminum. At concentrations greater than this, the action of heat tends to form crystalline lanthanide series metal aluminates and this should be avoided. On the other hand, while some lanthanide series metals work in trace levels, practical amounts of the lanthanide series metal oxide of about 1 per cent or more are usually preferred.

Suitable support and catalyst compositions can be prepared in a variety of ways. For the purpose of illustration, lanthanum will be used as the lanthanide series metal, although it is clear that both praseodymium and neodymium can be used in the same manner. Thus, a suitable support may be prepared by coprecipitation of aqueous decomposable salts of aluminum and lanthanum, followed by evaporation and heating to decompose the salts to their oxides, forming a substantially amorphous alumina having lanthanum oxide uniformly distributed throughout the alumina. This lanthana-alumina can be used by itself as a support or it can be deposited on a commercially available alumina or other well-known carrier material to thermally stabilize the carrier or catalyst produced therefrom. When the support is prepared in this manner, the stabilized support exists as a lamina. Thus, another embodiment is a laminar support consisting essentially of an inner carrier having deposited thereon an amorphous or transitional alumina lamina, said alumina lamina containing from 1 to 45 weight per cent based on said lamina of a lanthanide series metal oxide uniformly distributed throughout said lamina. Typical examples of carriers on which the lanthana-alumina can be deposited are zirconia, alumina-zirconia, calcium aluminate, alumina-titania, alumina, magnesia, alumina-magnesia, silica, silica-alumina, silica-magnesia, silicon carbide, zinc oxide, mullite, synthetic and natural zeolites, silica-zirconia, kaolin, silica-titania, magnesia-zirconia, magnesia-titania, zirconia-titania, alumina-silica-magnesia, alumina-silica-zirconia, alumina-silica-titania, alumina-magnesia-zirconia, alumina-magnesia-titania, alumina-zirconia-titania, silica-magnesia-zirconia, silica-magnesia-titania, silica-zirconia-titania, magnesia-zirconia-titania, or mixtures or these support materials. Also, such inert carriers as wire mesh, expanded metal, glass beads, marble chips, nails, metal turnings, metal screen, and the like are very well suited since they extend the use of the support.

Commercially available aluminas upon which the catalyst support and catalyst of this invention may be deposited include those sold by Aluminum Company of America "Desiccant Grade Active Aluminas; Grades F—1, F—3, and F—10, " by the Kaiser Aluminum Company as "KA-101, " and by Sumitomo Chemical Company as activated alumina "KHA, KHB, KHD, and experimental TY—1 and TY—3." Analysis and physical properties of typical aluminas used as carriers for the stabilized alumina and catalysts of this invention are:

CHEMICAL ANALYSIS

|  | Per Cent |
|---|---|
| $Al_2O_3$ | 85.0–98.7 |
| $Na_2O$ | 0.2–2.0 |
| $Fe_2O_3$ | 0.02–0.3 |
| $SiO_2$ | 0.02–5.0 |
| Loss on Ignition, 1100°C | 1.0–7.0 |

PHYSICAL PROPERTIES

| | |
|---|---|
| Surface area, m²/g | 75–360 |
| Form | granular or balls |
| Bulk density, lb/ft³ | 43–57 |
| Specific gravity | 3.1–3.3 |
| Pore volume ml/g | 0.25–0.6 |

The following examples illustrate the preparation of the stabilized support materials of this invention.

EXAMPLE 1

To a mixing vessel was added 47 grams of lanthanum acetate and 400 grams of aluminum nitrate. The mixture was melted by heating, and the respective oxides were produced by heating to about 600°C. The uniform solid mixture contained approximately 30 weight per cent of lanthanum oxide uniformly distributed throughout the alumina. The product was broken into smaller pieces and formed an attrition resistant support.

Similar results can be obtained by substituting the lanthanum acetate with praseodymium acetate or neodymium acetate.

EXAMPLE 2

To a mixing vessel is added an aqueous solution containing 60 grams of lanthanum acetate and 400 grams of aluminum nitrate. The water is evaporated to produce a uniform solid solution of lanthanum acetate and aluminum nitrate. The mixture was fused by melting and decomposed to the oxide at 600°C. The final catalyst support material contains 34.3 weight per cent lanthana.

Laminar supports are readily made by immersing the carrier, for example, wire mesh or silica-alumina, in the fused mixture and then removing the coated carrier and heating it to decompose the lamina to an oxide.

A suitable catalyst can be prepared from the supports prepared in Examples 1 and 2 by impregnating the support with various amounts of copper nitrate in aqueous solution. The following example illustrates this procedure.

EXAMPLE 3

To the catalyst support material prepared in Example 1 is added an aqueous solution of copper nitrate. After soaking for approximately 2 hours the remainder of the solution is drained and the impregnated support is dried. On heating the catalyst to about 600°C, the copper nitrate is decomposed to copper oxide. The final catalyst can contain from 0.005 to about 15 weight per cent copper oxide.

The effect of the lanthanide series metal oxide in preventing phase transformation of alumina under high temperatures is illustrated by comparing X-ray diffraction patterns of the catalyst support after preparation and after heating severely to 900°C for 2 hours. Similarly, the effect of the lanthana in preventing the formation of crystalline-copper aluminates in copper-alumina catalysts is shown by comparison of X-ray diffraction patterns before and after heating to 900°C. Table 1 shows the prevention of high temperature crystallization in both the support and the catalyst itself. Although the table gives the data for copper, any metal-containing oxidation catalyst which tends to promote crystallization or the formation of metal aluminates can be stabilized by the method of this invention.

TABLE 1

Prevention of High Temperature Crystallization in
Alumina Supports and Copper-Alumina Catalysts

| | Composition | | | | X-Ray Diffraction Analysis | |
|---|---|---|---|---|---|---|
| Example No. | Atom Ratio Cu/Al | Atom Ratio Lanthanide Series Metal/Al | CuO | Weight Per Cent Lanthanide Series Metal Oxide | Prepared at 600°C | Heated to 900°C |
| 4 | 0 | 0 | 0 | 0 | Amorphous | Some crystalline $Al_2O_3$ |
| 5 | 0.035 | 0 | 5 | 0 | Amorphous | Some crystalline $Al_2O_3$ |
| 6 | 0.035 | $Pr_2O_3$-0.1 | 4 | $Pr_2O_3$-23 | Amorphous | Amorphous |
| 7 | 0.035 | $La_2O_3$-0.1 | 4 | $La_2O_3$-23 | Amorphous | Amorphous |
| 8 | 0.035 | $Nd_2O_3$-0.1 | 4 | $Nd_2O_3$-24 | Amorphous | Amorphous |
| 9 | 0 | $La_2O_3$-0.13 | 0 | $La_2O_3$-30 | Amorphous | Amorphous |
| 10 | 0.09 | $La_2O_3$-0.13 | 0 | $La_2O_3$-26.6 | Amorphous | Amorphous |
| 11 | 0.17 | $La_2O_3$-0.13 | 5.8 | $La_2O_3$-24.6 | Amorphous | Some crystallinity |
| 12 | 0.35 | $La_2O_3$-0.13 | 27.8 | $La_2O_3$-21.0 | Amorphous | Some crystallinity |
| 13 | 0.70 | $La_2O_3$-0.13 | 43.0 | $La_2O_3$-16.5 | Amorphous | Crystalline $Al_2O_3$ and $CuAlO_4$ |

From the above information it can be seen that the lanthanide series metals act to prevent the formation of crystalline materials except at extremely high concentrations of metal oxidation catalysts. For instance, in Examples 11 to 13 with copper ranging from 15.8 to 43 per cent the amount of lanthana in the catalyst was insufficient to prevent formation of crystalline material and copper aluminates. However, an increase in the amount of lanthana to about 45 weight per cent would be sufficient to prevent the formation of crystalline material.

The following examples illustrate preferred embodiments of the invention.

EXAMPLE 14

In a mixing vessel equipped with stirrer is dissolved 0.04 gram mole of lanthanum acetate in 1,500 milliliters of a cold 0.75 gram molar solution of aluminum sulfate. The lanthanum-aluminum solution is added dropwise simultaneously with an equivalent solution of ammonium hydroxide to 500 milliliters of rapidly stirred water which is maintained slightly alkaline throughout the addition to precipitate lanthanum and aluminum hydroxide. The resulting gel is thoroughly washed in a basket centrifuge, towel dried and hand rolled into ¼-inch diameter spheres. The gel spheres are dried slowly at room temperature and calcined for 2 hours at 100°, at 300°, and finally at 800°C to yield a thermally stabilized alumina support with 3.8 per cent lanthanum oxide uniformly distributed throughout the alumina.

EXAMPLE 15

An aluminum hydroxide gel is prepared as in Example 14 except that the lanthanum acetate is not included. The washed gel is then thoroughly mixed with freshly precipitated and washed neodymium hydroxide, towel dried, and rolled into ¼-inch pellets and calcined according to the schedule in Example 14. The catalyst support contains about 4.3 per cent of neodymia uniformly distributed throughout the alumina matrix.

EXAMPLE 16

An aluminum hydroxide gel is prepared as in Example 14 except that praseodymium acetate is substituted for the lanthanum acetate; and, in addition, the ammonium hydroxide solution contains 5 grams of dissolved copper acetate. During precipitation the copper is deposited with the praseodymium and aluminum hydroxide. During precipitation the pH of the water solution should be maintained at approximately 7. As in Example 14, the resulting gel is washed, pelleted or extruded, air dried, and calcined to yield a uniform catalyst containing 1.3 per cent oxide and 4.2 per cent praseodymium oxide in the alumina matrix.

Using the above procedure, similar results can be obtained when the copper is substituted with decomposable compounds of vanadium, chromium, manganese, iron or with platinum or palladium or combinations of the foregoing.

Thus, it can readily be understood that according to the concentration and type of lanthanide series metal salt and metal-containing oxidation catalyst, a wide variety of catalysts are contemplated for stabilization by this invention. Typical are catalysts having the following compositions, all percentages are by weight:

15% copper oxide, 40% lanthana, 45% alumina
0.005% copper oxide, 1% lanthana, 98.995% alumina
4% copper oxide, 1% palladium, 15% lanthana, 80% alumina
10% copper oxide, 5% chromium oxide, 20% praseodymia, 65% alumina
15% manganese oxide, 35% neodymia, 50% alumina
10% iron oxide, 15% neodymia, 75% alumina
5% copper oxide, 2% vanadia, 0.1% palladium, 20% praseodymia, 72.9% alumina
14.4% copper oxide, 44.2% lanthana and 41.4% alumina on a KHA—24 alumina support
1% manganese oxide, 1% praseodymia and 98% lanthana on a KHA—46 alumina support
15% copper oxide, 34% lanthana and 51% alumina on a KA—101 alumina support Typical of catalysts which can be stabilized by the lanthanide series metal are those found in U.S. Pat. Nos. 3,170,758; 3,220,794; 3,224,981; 3,226,340; 3,227,659; 3,271,324; 3,380,810; 3,425,792; 3,428,573; 3,447,893; and 3,449,063 which are hereby incorporated by reference as if fully set forth.

Another aspect of this invention is a method of oxidizing carbon monoxide and hydrocarbons contained in internal combustion engine exhaust gases by contacting the exhaust gases at elevated temperatures with a catalyst of this invention. The catalysts have been tested in the exhaust system of an Olds-type single cylinder engine, 9:1 compression ratio, with 36 cu. in. displacement using indolene with 12 milliliters of tetraethyllead as "Motor Mix." The engine has a split leading to two 42 cu. in. catalyst containers having thermocouples attached before and after the catalyst bed. Catalyst bed temperature is usually around 870°C. The engine is operated for approximately 75–100 hours. Throughout the test a secondary air supply to provide oxygen for oxidation was introduced into the exhaust gas stream just prior to the catalyst bed. During the test the engine was continually cycled 50 seconds under idling conditions and 150 seconds under part throttle. The operating conditions for the test are as follows:

ENGINE OPERATING CONDITIONS

|  | Idle | Part Throttle |
|---|---|---|
| Engine speed, r.p.m. | 800 | 1340 |
| CO, % | 5.0 | 3.0 |
| Ignition timing, °btc | 10 | 10 |
| Added air, cfh | 100 | 100 |

The exhaust emissions are measured every 24 hours during the test. After the test is terminated, the spent catalyst is checked for hardness or attrition resistance by shaking the catalyst in a commercial paint shaker for 1 hour and determining the weight loss as fines. In many cases catalyst losses occurred already during the test. Therefore, the attrition resistance is a function of catalyst loss in the converter and loss during the shaker test. The attrition value ($A.V.$) for a particular catalyst combines both catalyst losses according to the equation $$A.V. = L + (100 - L) \times H/100$$

where $L$ is % loss of catalyst in the converter and $H$ is hardness number (% loss in shaker test).

Using the above-described test, several catalysts prepared according to this invention were tested for activity and attrition resistance. The following table gives the results of these tests.

crease catalyst activity, nevertheless, the longer life and added stability allows a greater increase in hydrocarbon and carbon monoxide oxidation. In other words, over the same period of time the end-of-test activity of the treated catalyst is generally higher than that of the untreated catalyst.

In addition to their use as exhaust gas catalyst supports, the lanthanide series metal oxide treated alumina materials may be used in any high temperature catalyst application or for insulators, shock absorbers, missile nose cones, and similar applications.

The foregoing description is illustrative of the invention and wide variations in catalyst composition and support composition as well as methods for their preparation can be envisioned by one skilled in the art. Thus, it is desired that the invention be limited only by the lawful scope of the following claims.

I claim:

1. A process for preparing a thermally stable and attrition resistant catalyst support, said process comprising
   a. forming an aqueous solution of a water-soluble, decomposable salt of a lanthanide series metal and a water-soluble aluminum salt;
   b. evaporating the free water from said solution to form a uniform solid solution;
   c. heating the resultant solid solution of aluminum salt and lanthanide series metal salt whereby said salts are thermally decomposed to their oxides; and
   d. cooling said solid solution whereby a solid thermally stable and attrition resistant support material is produced.

2. A process of claim 1 wherein said water-soluble aluminum salt is hydrated aluminum nitrate.

3. A process of claim 2 wherein said water-soluble, decomposable salt of a lanthanide series metal is lanthanum acetate.

4. A process of claim 2 wherein said water-soluble, decomposable salt of a lanthanide series metal is neodymium acetate.

5. A process of claim 2 wherein said water-soluble, decomposable salt of a lanthanide series metal is praseodymium acetate.

TABLE 2.—SINGLE-CYLINDER ENGINE TESTS

| Ex. No. | Composition | | | Time hours | Percent reduction | | | | Activation T, ° F. | | Hardness | Percent loss catalyst | A.V. |
|---|---|---|---|---|---|---|---|---|---|---|---|---|---|
| | | | | | S.O.T. | | E.O.T. | | | | | | |
| | Catalyst | Support | Treatment | | HC | CO | HC | CO | S.O.T. | E.O.T. | E.O.T. | | |
| 17 | 3% Cu plus 0.1% Pd | Ka-101 alumina | None | 75 | 88 | 98 | 46 | 75 | 365 | >500 | 28.8 | 7.9 | 34.4 |
| 18 | 3% Cu plus 0.1% Pd | do | Rare* earth oxides | 75 | 88 | 98 | 50 | 80 | 365 | 435 | 16.9 | 5.9 | 21.8 |
| 19 | 3% Cu plus 0.04% Pd | KA-101 alumina | Al₂O₃, SiO₂ | 74 | 90 | 95 | 66 | 89 | 345 | 395 | 11.4 | 0 | 11.4 |
| 20 | 3% Cu plus 0.04% Pd | do | Al₂O₃, La₂O₃ | 74 | 87 | 96 | 66 | 89 | 330 | 375 | 9.5 | 2 | 11.3 |
| 21 | Mn (27.5 g./l.) | Low Na alumina | None | 70 | 81 | 93 | 33 | 47 | 450 | 425 | 12.7 | 0 | 12.7 |
| 22 | Mn (27.5 g./l.) | do | Al₂O₃, La₂O₃ | 70 | 81 | 90 | 20 | 27 | 400 | 445 | 6.5 | 0 | 6.5 |
| 23 | Mn | F-1 alumina | None | 70 | 81 | 86 | 54 | 33 | 395 | 505 | 10.7 | 0 | 10.7 |
| 24 | Mn | do | La₂O₃ | 70 | 77 | 86 | 43 | 27 | 395 | 500 | 3.4 | 0 | 3.4 |
| 25 | Mn (27.5 g./l.) | do | None | 75 | 90 | 97 | 78 | 90 | 430 | 470 | 10.4 | 0 | 10.4 |
| 26 | Mn (27.5 g./l.) | do | La₂O₃ | 75 | 87 | 98 | 73 | 88 | 380 | >500 | 7.6 | 0 | 7.6 |
| 27 | 3.1% Cu plus 0.15% Pd | KIIA-46 alumina | None | 75 | 69.5 | 90 | 35 | 60 | 385 | 465 | 12.2 | 0 | 12.2 |
| 28 | 3.1% Cu plus 0.15% Pd | do | Al₂O₃, La₂O₃ | 75 | 74.5 | 88 | 41 | 65 | 375 | 425 | 11.4 | 0 | 11.4 |

*Mixture of La₂O₃, Pr₂O₃, and Nd₂O₃.

From the foregoing tests the attrition resistant properties of the lanthanide series metal oxide stabilized catalyst of this invention are clearly established. In many cases the end-of-test hardness is twice that of the untreated catalyst as shown by the low attrition value. Although the catalyst treatment does not in itself in- 6. A process of claim 1 wherein said heating is carried out at a temperature of from about 400° to about 750°C.

7. A process for preparing a thermally stable and attrition resistant copper catalyst, said process comprising a. forming an aqueous salt solution of water-soluble, decomposable aluminum, lanthanum, and copper salts;
b. evaporating the free water from said solution whereby a uniform solid solution of said salts is produced;
c. heating said solid solution at a temperature of from about 400° to about 750°C to thermally decompose said salts to their oxides; and
d. cooling said oxides whereby a catalyst composition consisting essentially of an alumina support having lanthanum oxide and copper oxide uniformly dispersed throughout said alumina is produced.

* * * * *